US012417671B2

(12) United States Patent
Soon-Shiong

(10) Patent No.: US 12,417,671 B2
(45) Date of Patent: *Sep. 16, 2025

(54) AVATAR-BASED SPORTS BETTING

(71) Applicant: NANT HOLDINGS IP, LLC, Culver City, CA (US)

(72) Inventor: Patrick Soon-Shiong, Culver City, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 18/385,427

(22) Filed: Oct. 31, 2023

(65) Prior Publication Data

US 2024/0062611 A1 Feb. 22, 2024

Related U.S. Application Data

(63) Continuation of application No. 17/980,748, filed on Nov. 4, 2022, now Pat. No. 11,842,601, which is a continuation of application No. 16/818,057, filed on Mar. 13, 2020, now Pat. No. 11,580,815.

(60) Provisional application No. 62/818,472, filed on Mar. 14, 2019.

(51) Int. Cl.

*A63F 9/24* (2006.01)
*A63F 11/00* (2006.01)
*G06F 13/00* (2006.01)
*G06F 17/00* (2019.01)
*G07F 17/32* (2006.01)

(52) U.S. Cl.

CPC ...... *G07F 17/3211* (2013.01); *G07F 17/3223* (2013.01); *G07F 17/3288* (2013.01)

(58) Field of Classification Search

CPC ... G07F 17/32; G07F 17/3211; G07F 17/3214
USPC .............................. 463/1, 20, 22, 25, 30, 39
See application file for complete search history.

(56) References Cited

U.S. PATENT DOCUMENTS 8,374,871 B2 2/2013 Ehsani et al.
8,583,416 B2 11/2013 Huang et al.
9,324,327 B2 4/2016 Ehsani et al.
9,430,467 B2 8/2016 Ehsani et al.
9,547,678 B2 1/2017 Wnuk et al.
10,165,339 B2 12/2018 Huske et al.
10,347,240 B2 7/2019 Master et al.
10,572,724 B2 2/2020 Wnuk et al.

*Primary Examiner* — Adetokunbo O Torimiro

(74) *Attorney, Agent, or Firm* — Frederick H. Gribbell; Russell F. Gribbell; Joseph L. Ulvr

(57) ABSTRACT

Methods and systems are provided to display a real world event on a client device with avatars. Appropriate parameters for the real world event are provided and participants in the real world event are associated to avatars. As the real world event begins, a server is configured to provide information on the real world event to the client device, and the client device displays a representation of a virtual event using the avatars and the information received from the server.

26 Claims, 11 Drawing Sheets

AVATAR-BASED SPORTS BETTING

CROSS-REFERENCE TO RELATED APPLICATIONS

The present application is a continuation of application Ser. No. 17/980,748, titled "Avatar-Based Sports Betting" filed on Nov. 4, 2022; which is a continuation of application Ser. No. 16/818,057, titled "Avatar-Based Sports Betting" filed on Mar. 13, 2020; and claims priority to provisional patent application Ser. No. 62/818,472, titled "Avatar-Based Sports Betting" filed on Mar. 14, 2019.

FIELD OF THE DISCLOSURE

The present disclosure relates to systems and methods for presenting real world events on an avatar-based virtual platform.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

Betting on horse racing has long been allowed in most states of the United States, but in May 2018, the Supreme Court struck down a federal prohibition on sports betting, thereby allowing each state to adopt its own sports betting regime.

While betting on a sporting event may now be possible, in some scenarios watching the event on which a bet was placed may be more difficult. For example, a user may place a bet on a horse race using an electronic device or the like, but the race may not be broadcast on any of the local television channels, or the user may not have access to view the event. Further, while in some cases the sporting event may be available for viewing through the mobile device, the amount of data consumption required to view a sporting event live from a cellular network may not be practical.

From the perspective of the user or consumer, it is preferable and more enjoyable to view the sporting event on which the user placed a bet. Further, in some cases the user may wish to bet on an event but may not be interested in the particular sport.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

The present disclosure is directed to a virtual event broadcasting system comprising at least one non-transitory computer readable memory storing software instructions; and at least one processor coupled with the at least one memory and, upon execution of the software instructions, performs the following operations: generating an event identifier representing a real-world event having a plurality of real-world participants; storing, in a client device memory, at least one avatar of a virtual environment presentation associated with the event identifier for each of the real-world participants; generating a participant identifier for each of the real-world participants; mapping each participant identifier to a corresponding avatar of the at least one avatar; transmitting, to the client device, an event update message related to a change in the real-world event and including at least some of the participant identifiers with movement information for the corresponding real-world participants in the real-world event; and causing the client device to update the virtual environment presentation related to the real-world event by updating a movement of the corresponding avatar for each of the at least some of the participant identifiers according to their respective movement information.

The present disclosure is further directed to a non-transitory computer-readable medium having stored thereon executable code for execution by a processor of a computing device, the executable code comprising instructions for: generating an event identifier representing a real-world event having a plurality of real-world participants; storing, in a client device memory, at least one avatar of a virtual environment presentation associated with the event identifier for each of the real-world participants; generating a participant identifier for each of the real-world participants; mapping each participant identifier to a corresponding avatar of the at least one avatar; transmitting, to the client device, an event update message related to a change in the real-world event and including at least some of the participant identifiers with movement information for the corresponding real-world participants in the real-world event; and causing the client device to update the virtual environment presentation related to the real-world event by updating a movement of the corresponding avatar for each of the at least some of the participant identifiers according to their respective movement information.

The present disclosure is further directed to a method for broadcasting a virtual event, comprising: generating an event identifier representing a real-world event having a plurality of real-world participants; storing, in a client device memory, at least one avatar of a virtual environment presentation associated with the event identifier for each of the real-world participants; generating a participant identifier for each of the real-world participants; mapping each participant identifier to a corresponding avatar of the at least one avatar; transmitting, to the client device, an event update message related to a change in the real-world event and including at least some of the participant identifiers with movement information for the corresponding real-world participants in the real-world event; and causing the client device to update the virtual environment presentation related to the real-world event by updating a movement of the corresponding avatar for each of the at least some of the participant identifiers according to their respective movement information.

The present disclosure is further directed to a virtual event broadcasting system comprising: at least one non-transitory computer readable memory storing software instructions; and at least one processor coupled with the at least one memory and, upon execution of the software instructions, performs the following operations: receiving a message from a server, the message comprising an event identifier representing a real-world event having a plurality of real-world participants, and information on the plurality of real-world participants; storing, in the memory, one avatar of a virtual environment presentation associated with the event identifier for at least one of the real-world participants; receiving a participant identifier for each of the plurality of real-world participants; mapping each participant identifier to a corresponding avatar; receiving, from the server, an event update message related to a change in the real-world event and including at least some of the participant identifiers with movement information for the corresponding real-world participants in the real-world event; and updating the virtual environment presentation related to the real-world event by updating a movement of the corresponding avatar for each of the at least some of the participant identifiers according to their respective movement information.

The present disclosure is further directed to a virtual event broadcasting system comprising: at least one non-transitory computer readable memory storing software instructions; and at least one processor coupled with the at least one memory and, upon execution of the software instructions, performs the following operations: generating an event identifier representing a real-world event having a plurality of real-world participants; generating a participant identifier for each of the at least one of the real-world participants; and transmitting, to a client device, an event update message related to a change in the real-world event and including at least some of the participant identifiers with movement information for the corresponding real-world participants in the real-world event; wherein the event updated message causes the client device to update a virtual environment presentation related to the real-world event by updating a movement of a plurality of avatars corresponding to each of the at least some of the participant identifiers according to their respective movement information.

The present disclosure is further directed to a virtual event broadcasting system comprising: a server device; and a client device; wherein the server device is configured to: generate an event identifier representing a real-world event having a plurality of real-world participants; generate a participant identifier for each of the real-world participants; and transmit, to the client device, an event update message related to a change in the real-world event and including at least some of the participant identifiers with movement information for the corresponding real-world participants in the real-world event; and wherein the client device is configured to: store, in the client device memory, an avatar of a virtual environment presentation associated with the event identifier for at least one of the real-world participants; map each participant identifier to a corresponding avatar; upon receiving the event update message, update the virtual environment presentation related to the real-world event by updating a movement of the corresponding avatar for each of the at least some of the participant identifiers according to their respective movement information.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The present disclosure will be better understood having regard to the drawings in which.

DETAILED DESCRIPTION OF THE DRAWINGS

Figure 1:
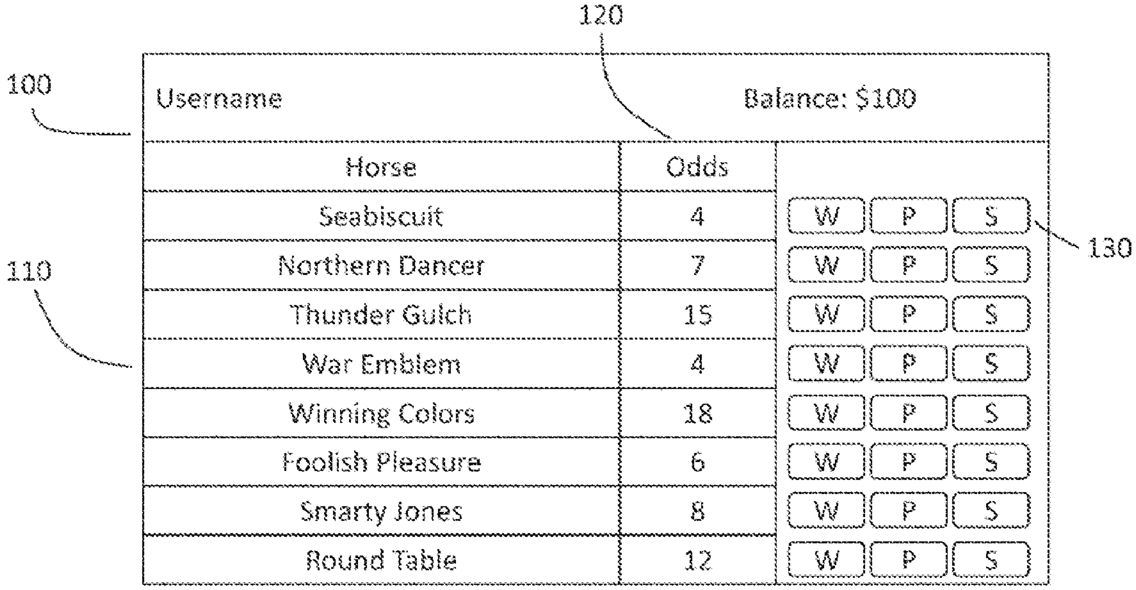
FIG. 1 is an illustration of a user interface according to at least one embodiment of the present disclosure.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise a processor, possibly having one or more cores, configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on UDP, TCP, IP, HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

As used in the description herein and throughout the claims that follow, when a system, engine, server, device, module, or other computing element is described as configured to perform or execute functions on data in a memory, the meaning of “configured to” or “programmed to” is defined as one or more processors or cores of the computing element forming structural elements being programmed by a set of software instructions stored in the memory of the computing element to execute the set of functions on target data or data objects stored in the memory. Use of such language is not to be construed as means plus function language in view of resulting structural elements.

One should appreciate that the disclosed techniques provide many advantageous technical effects including the broadcasting of a real world event to multiple client devices with small amounts of data.

The present disclosure provides methods and systems for representing a real world event on an avatar-based virtual platform. While the present disclosure will be described with reference to specific examples, the present disclosure is not limited to these examples. For example, while some embodiments will be described with reference to a horse race, the same principles may be applied to an election, a football game, a soccer game, a cricket match, Olympic games, a race, a scavenger hunt, e-sports, Robot Wars, AI robot competitions, virtual AI robot war, gambling events such as a poker tournament, or other type of real-world events, whether the real-world events are formal events following official rules or informal events such as a flag football game.

There can be other real world events with or without human interaction or with limited human interaction. For example, Robot Wars is a competition where robots fight and are remotely controlled by a person or a team. For such competitions, the avatar may be based on the robot in the arena or on the person or team controlling the robot or some combination of both. In another example the robotic competition may not have any human interaction once the event starts and it is up to the robot's programmed AI to compete. Another type of event is a simulated event in a virtual space with only AI participants and no human interaction. A simulated event is similar to an AI robotic competition, except that instead of having physical robots and a real environment, it takes place completely in a virtual environment and may have a limited list of moves that can be made similarly to a chess game between computer AI players. Events can be real world events or virtual events without human interaction or any combination of real and virtual events. Thus, other types of events, whether sports related or not, are within the scope of the present disclosure.

In some cases the events in the digital, virtual environment may be the same event as in real life, or may be a different event. For example, the virtual event and real event may both be horse races. However, in other embodiments the real event may be mapped to a different type of virtual event. For example, a real world horse race may be mapped to a virtual battle royale video game format, where real world statistics are applied to virtual world attributes, as described in more detail below.

According to at least one embodiment, a user may be presented with a user interface to place a bet on a horse race. One such exemplary user interface is presented with respect to FIG. 1. As shown in FIG. 1, the user interface 100 comprises a list of horses 110 that will participate in the race, odds 120 for each horse, and betting buttons 130, again for each horse. In this example, buttons are provided for a win, place, and show. A win is when a horse finishes first in the race, a place is when a horse finishes first or second, and a show is when a horse finishes first, second, or third. Many other types of betting are known and are included in the scope of the present disclosure.

Once a bet has been placed (or alternatively, with no bets being placed), a user may wish to watch the race. According to one embodiment, the race is shown on a display like the display illustrated in FIG. 2.

Figure 2:
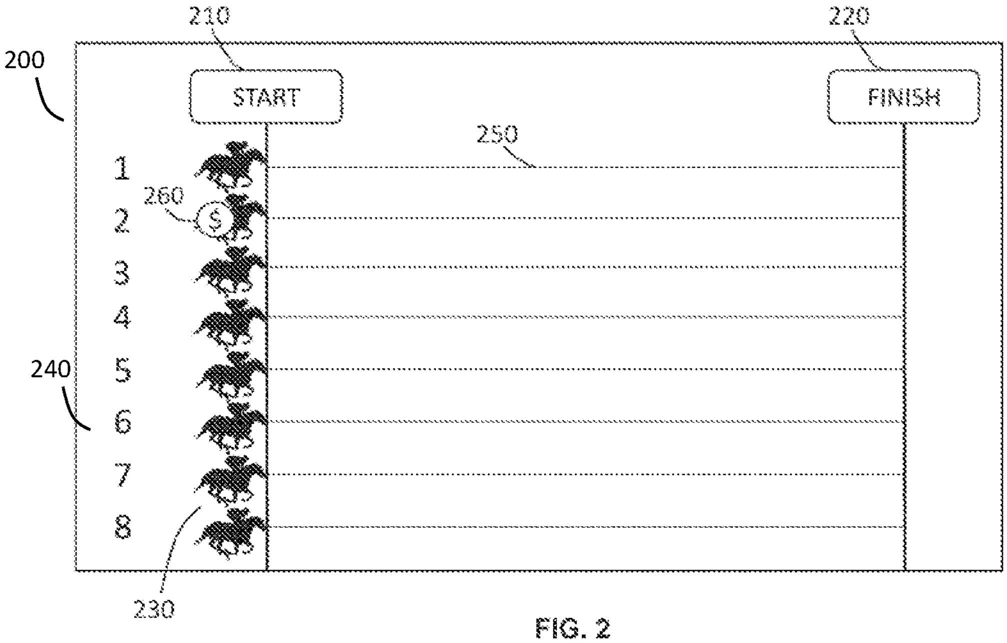
FIG. 2 is an illustration of a user interface according to at least one embodiment of the present disclosure.

As seen in FIG. 2, a user interface 200 comprises avatars 230 for every horse of the real race. In this embodiment, every avatar 230 is a picture of a horse, but other types of avatars can be used and the present disclosure is not so limited. In this embodiment, every horse is identified by a number 240 from one through eight. Optionally, the horse's real name may be displayed next to the avatar representing it.

Also seen in FIG. 2 is bet indicator 260. A bet indicator is used to signal to the user that the avatar in question has money placed on it. In this embodiment the bet indicator comprises a circle with a dollar sign but other types of bet indicators can be used.

The user interface 200 further comprises a start line 210 and a finish line 220, representing the start and beginning of the race, respectively. Optionally, user interface 200 may also comprise race lines 250 for representing the trajectory of each avatar from start line 210 to finish line 220.

According to at least some embodiments, various milestones may be placed on the track such as at halfway points or the like.

At the beginning of a race, each digital avatar 230 is lined-up at the start line 210, as is illustrated in FIG. 2. Once the race begins, each avatar will be moved along its corresponding race line 250 in proportion to the amount of track covered by the real horse, as will be described in greater detail below. As the real race ends, the virtual race illustrated in user interface 200 also ends, and the first avatar to cross finish line 220 is declared the winner, and any bet involving the winning avatar is paid out into the user's account. According to at least some embodiments, the winner of the real race is also the winner of the virtual race. Although the embodiment described with respect to the horse race assumes a one-to-one correspondence in time, it is also contemplated that the virtual, avatar-based representation could be an altered time perspective; where time is expanded, time shifted, time contracted, rearranged in time possibly to support dramatic effects, or other time altered behaviors.

Figure 3:
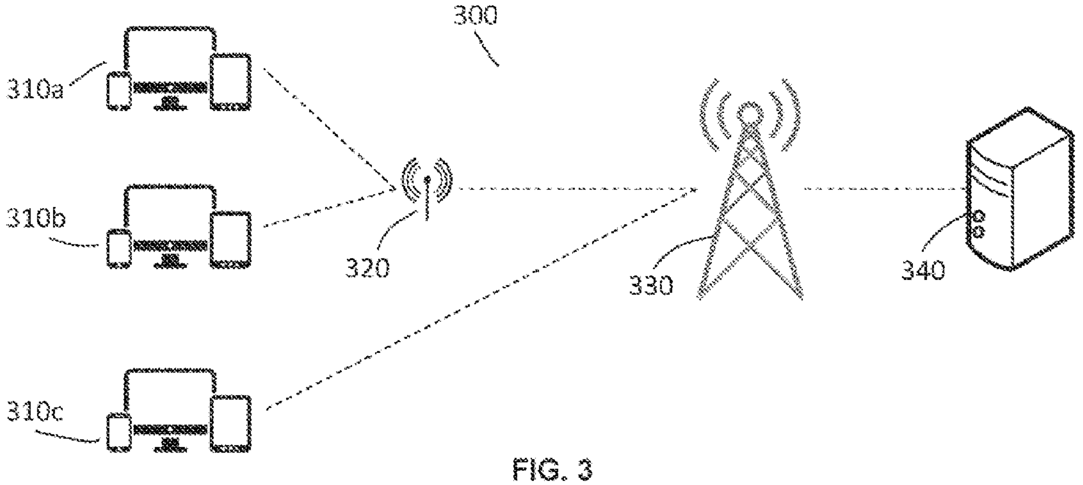
FIG. 3 is a schematic diagram of a network used to implement at least one embodiment of the present disclosure.

Reference is now made to FIG. 3 which shows an exemplary network for facilitating the present methods and systems. As seen in FIG. 3, the network 300 comprises a server 310. Server 310 may be situated in proximity to the real race, or at another unspecified location. Server 310 is connected to the Internet 320 or any other suitable Wide Area Network (WAN). Through the Internet 320, server 310 may communicate with any number of client devices, such as client devices 330*a*, 330*b*, and 330*c*. As illustrated in FIG. 3, client devices may be connected to the Internet 320 directly, or through an access point 340 such as a WiFi™ router a cellular basestation, among other similar options.

According to at least some embodiments, communications between server 310 and client devices 330*a*, 330*b*, and 330*c* are secured. In at least one embodiment, a shared secret between server 310 and one of client devices 330*a*, 330*b*, and 330*c* is used as a symmetrical key to encrypt and decrypt communications between the server 310 and the one client device. Alternatively, each of the server 310 and client devices 330*a*, 330*b*, and 330*c* may have a public key and a private key. When a message is intended for a first recipient, the first recipient's public key is used for encryption and the first recipient's private key is used for decryption. The establishment of a symmetrical key, or of public-private key pairs may be performed using any means known in the art. Acceptable encryption technologies include AES, 3DES, RSA, Blowfish, or Twofish. Generally, any encryption technique, whether currently existing at the time of the present disclosure or not, may be used in conjunction with the techniques described herein without departing from the scope of the present disclosure. Further, in some embodiments, non-transitory computer readable memories storing avatar-based information can be secured through ensuring one or more memories adhere to a level of the FIPS 140-2 standard. Such an approach is considered advantageous because complying with such standards can limit hacking or cheating.

In at least one embodiment, betting is performed locally in a venue provided for the purpose of betting, and therefore no electronic transmission related to betting is required to occur. In such an embodiment it may be desirable to restrict access to viewing the real world event using conventional means and only provide access to the virtual event. This may be performed a number of ways, some of which are discussed below.

According to at least one embodiment, personal devices such as smart phones, tablets, laptops, and the like may be forbidden in an area where betting occurs, and betting, as well as viewing the virtual event may be performed on a specialized client device programmed to only perform allowed actions, such as betting on an event (e.g., horse race) and viewing a virtual representation of the event.

According to at least another embodiment, personal devices such as smart phones, tablets, laptops, and the like may be allowed in the area where betting occurs if they have installed thereon an application which recognizes their location and restricts functionality based on the location. For example, the application may ensure that the personal device is connected to a Wireless Local Area Network (WLAN) and block any communications to and from the personal device other than through the WLAN. Simultaneously, the WLAN may only allow the presentation of the virtual event through a recognized server and disallow communications with unrecognized servers.

Other means of restricting the viewing of a real world event within a specified location are also within the scope of the present disclosure. For example, device communication can be restricted based on GPS location or based on geofencing techniques. Yet another technique to restrict access to remote information is to construct the local betting venue as a Faraday cage so that no wireless signals can be received. Still further, one or more lockout signals can be sent to devices. Example techniques that can be leveraged to generate lockout signals are described in U.S. Pat. No. 9,993,7030 to Lockton et al. titled "Methodology for Equalizing Systemic Latencies in Television Reception in Connection with Games of Skill Played in Connection with Live Television Programming", filed Jun. 16, 2017.

Figure 4:
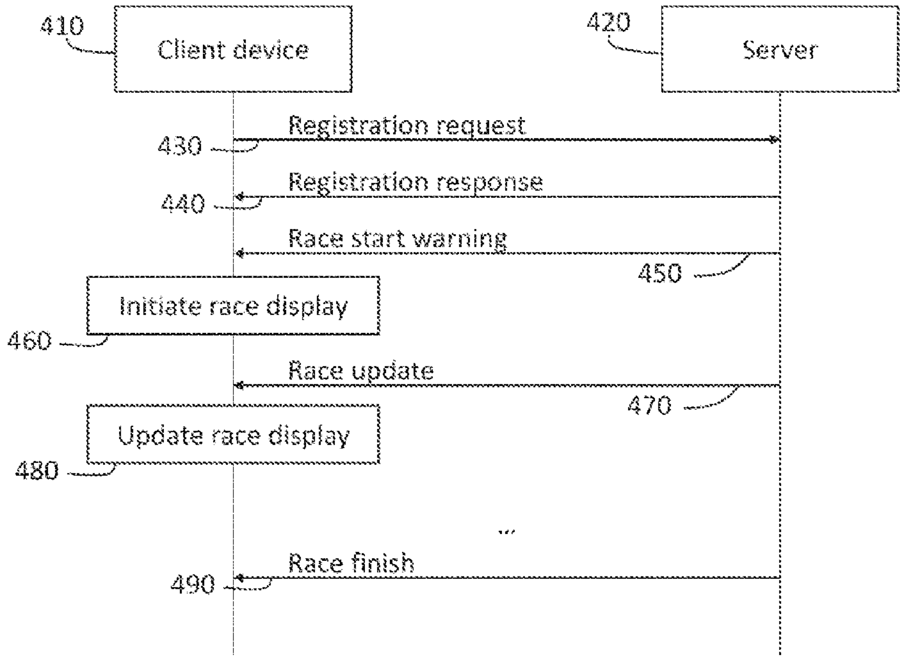
FIG. 4 is a flow diagram of a method according to at least one embodiment of the present disclosure.

Communications between a client device and a server according to the present disclosure is exemplified with respect to FIG. 4.

As shown in FIG. 4, a client device 410 communicates with a server 420, either directly or through intermediate network entities. In at least one embodiment, the client device 410 has a client application installed thereon for implementing methods of the present disclosure.

The process begins at message 430 where client device 410 sends a registration request to server 420. In at least one embodiment, message 430 may be preceded by a login message, comprising a user name of the user and a hashed password. In at least some other embodiments, message 430 may comprise a user name and a hashed password along with the registration request. In yet another embodiment, the registration request is transmitted without having previously logged in and without any user credentials. In yet some further embodiments, the registration request may include a race identifier, or other event relevant identifiers, for a race that the user wishes to bet on. Example types of identifiers can include GUIDs, UUIDs, Hash values, or other types of identifiers.

Upon receiving the registration request 430, server 420 responds by providing a registration response 440. In at least some embodiments, where the user name and password are not recognized, an error message may be provided. Otherwise, the registration response confirms to client device 410 that its request was properly received. Registration response 440 may include a session identifier and a race identifier, as well as any other information required by the client prior to the start of the race. Other information included in registration response 440 may include an estimated start time for the race, track conditions, weather information, information on jockeys, odds for each horse, and the like.

Notably, as more and more users place bets on various horses, the bookie may find it advantageous to update the odds offered to the users for each horse. Therefore, in some embodiments, server 420 may send a message with updated odds prior to the start of the real world event.

The session identifier may be a unique value (e.g., GUID, UUID, etc.) assigned to the session between the client device 410 and the server 420. Any communication between client device 410 and the server 420 may include the session identifier in a field reserved for that purpose until that session is terminated.

The race identifier may be a unique value assigned to the race. Any communication between client device 410 and server 420 pertaining to a given race may include the race identifier for that given race in a field reserved for that purpose. This allows client device to present multiple races or events simultaneously and receive messages from server 420 for each race or event. In some embodiments, the race identifier may be unique only within the session between client device 410 and server 420. In other embodiments, the race identifier may be globally unique.

For example, registration response 440 may comprise a list of horses participating in the race and their identifiers. One such list is illustrated in Table 1, below.

TABLE 1

| Horse name | ID |
|---|---|
| Seabiscuit | 1 |
| Northern Dancer | 2 |
| Thunder Gulch | 3 |
| War Emblem | 4 |
| Winning Colors | 5 |
| Foolish Pleasure | 6 |
| Smarty Jones | 7 |
| Round Table | 8 |

Upon receiving a list of horse names and identifiers as described above, client device 410 may confirm the name of horses participating in the race, and is now capable of receiving information identifying each horse simply by a number identifying the horse, instead of the horse's full name. To the extent that the client device has a mapping between real horses and avatars, a list such as the list illustrated in Table 1 may be used to create a mapping between horse identifiers and avatars.

For example, upon receiving a registration response 440 including a list of race participants, client device 410 may allocate memory for each participant. Within the memory of client device 410, a specific participant may be identifiable based on the session identifier, the race identifier, the participant identifier, or other identifiers associated with the event. This allows messages from server 420 regarding a specific participant to be received and interpreted correctly at client device 410.

According to at least one embodiment, client device 410 may maintain, for each virtual event, an array of pointers to avatar objects, such that a participant identifier may be used as an index in the array to obtain a pointer pointing to the avatar object corresponding to the participant. However, other means of mapping participant identifiers to avatars are also within the scope of the present disclosure, possibly including look up tables, hash tables, databases, or other techniques by which data can be indexed.

Therefore, prior to the start of the real world event, server 420 is aware of the participants in the real world event, and may assign a participant identifier to each participant in the real world event. In at least one embodiment, participant identifiers ranging from 0 to N−1, where N is the number of participants, are assigned randomly.

When a client device 410 registers to view a virtual event based on the real world event, server 420 sends to the client device 410 a mapping as illustrated in Table 1. The server may further provide, in at least some embodiment, along with the name of each participant and the participant identifier, further information that may be useful to the client device. For example, when the participants are horses in a horse race, further information may include lane information, color information, jockey information, amongst others. When the participants are players in a game such as football or basketball, further information may include number, position, and statistics, amongst others.

When client device 410 receives the mapping with any additional information, the client device may create avatar objects for each participant and assign each avatar object their respective participant identifier. The additional information provided by the server may be used to configure the avatar object.

Client device may further configure the virtual venue based on the received weather conditions, or other related environmental condition. In some cases, the odds for each horse may be modified for the weather, as some horses perform better in the rain whereas others are known to prefer dry conditions. The presentation of the virtual event may reflect the received weather conditions in at least some embodiments.

While the example of FIG. 4 provides information about horses and conditions, in some cases the real world information may be mapped to pseudonyms. For example, rather than identify a horse by its real name, if the race is being mapped to an online battle, pseudonyms may be provided rather than the real name of the horses. Further, real world statistics could be mapped to virtual statistics that impact the corresponding avatars.

At some point near the start of the race, server 420 sends a race start warning message 450, indicating that the race will start momentarily. For example, message 450 may be transmitted 1 minute before the expected start of the race. Upon receiving message 450, client device 410 may prepare for displaying the race, as illustrated by block 460. Client device 410 may issue a notification to the user that the race will start soon by providing an audio alert and displaying the user interface for showing the race, for example the user interface of FIG. 2.

Upon the client device 410 being ready for the start of the race, the client device waits for an indication that the race started. When the race starts, server 420 sends a race update message 470 to client device 410. The first race update message received by client device 410 indicates the start of the race. Accordingly, such a message may only provide an indication that the race started, without specifying the position of each horse. Alternatively, the first race update message may include a position for each horse.

According to at least one embodiment, a race update message includes a list of each horse within the race and their respective position on the race track. The respective position of each horse may be expressed as a number between 0 to 100, corresponding to what percentage of the track they have traveled so far. In some embodiments, greater granularity may be desired, and the respective position of each horse may be expressed as a number between 0 to 1000, or another suitable number. Other means of indicating the respective position of each horse are also within the scope of the present disclosure. One should appreciate that a update message can take the form of a packet of information transmitted over a network. While in some cases, the packet might be binary encoded in other cases the packet might comprise a serialized set of data encoded in JSON, XML, or other mark-up language. In more preferred embodiments, the packet would be binary encoded and encrypted to prevent cheating.

In at least one embodiment, the information provided in a race update message corresponds to Table 2, below.

TABLE 2

| Horse ID | Position |
|---|---|
| 1 | 17 |
| 2 | 16 |
| 3 | 20 |
| 4 | 16 |
| 5 | 18 |
| 6 | 22 |
| 7 | 15 |
| 8 | 17 |

Figure 5:
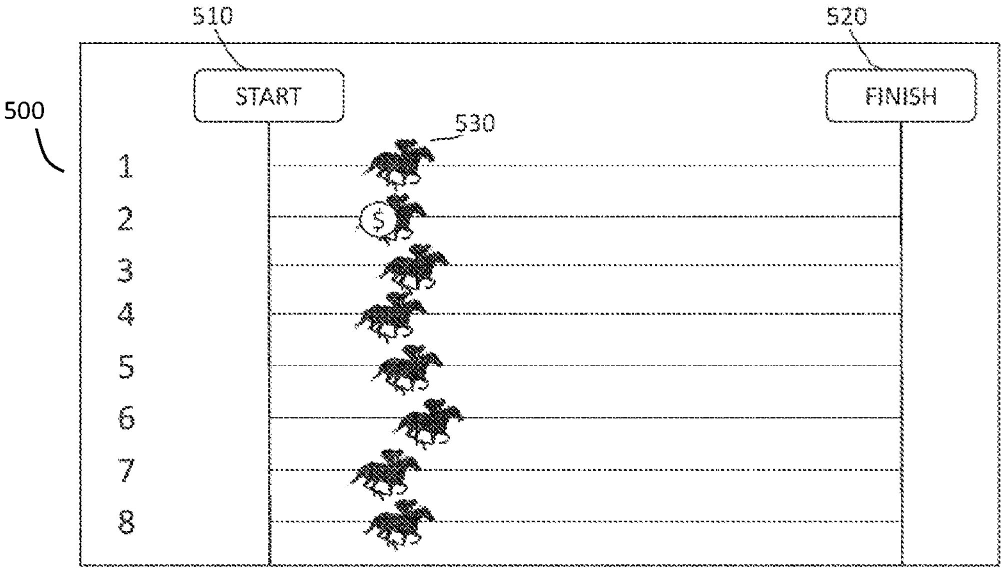
FIG. 5 is an illustration of a user interface according to at least one embodiment of the present disclosure.

Upon receiving a race update message or packet, client device 410 updates its display to reflect the position of the avatars, based on a mapping of the horse identifier with the different avatars, as illustrated by block 480. For example, upon receiving a race update message, client device may move the avatars along to produce a display such as that shown in FIG. 5. As can be seen in FIG. 5, each avatar has been moved along the race track by an amount proportional to their respective position field in Table 2. Specifically, in FIG. 5, a user interface 500 comprises a start line 510 and a finish line 520. Avatars 530 have been moved forward along the track to reflect their progress in the real race.

Alternatively, upon receiving a race update message, client device 410 updates its display to move each avatar at a speed corresponding to the distance traveled by the real horse since the last message. In the case of the first race update message, the initial position of the horse (and corresponding avatar) is zero, and therefore the update message includes the distance traveled since the start of the race. In at least one embodiment, each avatar starts moving at a speed proportional to the distance traveled since the start of the race, for a period of time corresponding to the expected time between two consecutive race update messages.

In at least one embodiment, the avatars are animated as they are moved along the track. For example, if the avatars are horses, the legs of the avatars could be animated to move at a speed proportional to the avatar's movement. Alternatively, if the avatars are cars, the wheels of the cars could be animated to roll during their movement. Thus, attributes of the real-world entities (e.g. horses, etc.) can be mapped to aspects of the virtual entities rendered in the avatar setting.

As the race progresses, more race update messages are received at client device 410, and each avatar is moved along the race track, until the end of the race when a winner is declared. When the race is finished, server 420 transmits a race finish message 490 to client device 410. According to at least one embodiment, the race finish message 490 includes the final position of every horse in the race.

In order for the viewing of the race to be as enjoyable as possible, as many race update messages as possible should be transmitted. In one embodiment, a new race update message may be expected every 0.1 second, or other time period. Alternatively, the rate of update may be based on the quality of the connection between the client device 410 and the server 420. One aspect of the inventive subject matter is to control synchronization of the virtual event with the real-world event subject to latency among the various devices involved in the broadcast. Example techniques for synchronizing devices that could be adapted for use herein are described in U.S. Pat. No. 10,165,339 to Husk et al. titled "Method and System for Managing Client Resources and Assets for Activities on Computing Devices", filed Jan. 15, 2016. More specifically, rather than merely synchronizing devices per se, the disclosed inventive subject matter can take further factors into consideration such as where the virtual event is being hosted; a client device versus a remote service for example. Mobile client devices might host a local virtual event so that only real-world event data needs to be transmitted thereby reducing cost of bandwidth over cellular networks.

In at least some embodiments, race update messages are transmitted to the client device immediately upon relevant data being generated at the server. This will minimize latency between the real world event and the virtual event, assuming a strong network connection between the client device and the server. One should appreciate that the nature of the data sent to a client device can depend on the nature of the client device as alluded to above. Mobile cellular devices would be best served by receiving minimal data, while desktop computers could receive full data including graphic data for rendering. In such cases, a single event can be received by multiple client devices where each client device could host different implementations of a client application suited to the client device itself or based on the preferences requested by the user. The user may wish to get the minimum information sent to their desktop or the max possible information sent to their mobile device based their interest or involvement in a given event (e.g. according to a scale, slider bar, etc.). The system can be setup to manage the type of data that the user can receive based on the user's or the device's attributes, for example the system could prioritize the data being sent to the device based on whether a user has placed a wager, and the amount of the user wager. This is just a small sample of the attributes that can be looked at.

In at least some other embodiments, a delay may be introduced intentionally between the real world event and the virtual event, to allow for data from the real world event to be generated in a more sophisticated manner, and to allow the client to render an appropriate animation.

When the latency between the real world event and the virtual event is sufficiently large, and betting on the event is allowed, restrictions on viewing the real world event in real time, such as through a video stream, may be enforced. Alternatively, betting on the virtual event may be restricted to before the real world event starts. Thus, one aspect of the inventive subject matter is considered to include restricting access to real event data while also ensuring all corresponding avatar-based content is delivery substantially at the same time or in a synchronized fashion by adjusting for latency among all edge devices.

According to at least some embodiments, an audio stream of commentary for the race may be streamed to client device 410, either from server 420 or from another server, and played during the race. The audio may be tagged with a timestamp from the real world event to be matched with timestamps from update messages, so that the audio remains synchronized with the display of the virtual event. The audio may include play by play, color commentary, amongst other options. In at least one embodiment, audio commentary specifically tailored to the avatar race may also be provided instead of audio commentary originally intended for the real world race. The audio commentary may be generated by a person in real time and streamed through server 420, or the audio commentary may be generated based on a library of pre-recorded phrases.

In at least some embodiments, the commentary may be analyzed in order to provide visual emphasis. For example, certain common phrases may be identified and represented as a visual effect. As a non-limiting example of the above, when the phrase "on fire" is said about a participant of the real world event in the commentary, the avatar corresponding to that participant may appear to be engulfed in flames. Other such phrases and corresponding visual effects are contemplated to be within the scope of the present disclosure.

This feature may be implemented at the server side by registering phrases with a speech recognition module running on the server that converts utterances to digital data spoken content. When a registered phrase is recognized, an update message is transmitted to the client device with a code indicating to the client device to display the corresponding visual effect.

Some registered phrases may relate to the real world event as a whole, whereas others may relate only to a single or multiple real world event participants. In the latter case, the relevant participants may be identified by the speech recognition module by registering the name of each participant. In one embodiment, the phrase will be deemed to relate to the last participant mentioned in the commentary prior to the registered phrase.

The following non-limiting example is provided to illustrate the above. If the commentary was to the effect of "Seabiscuit is picking up speed, Seabiscuit is coming in the inside lane, he's on fire!", the speech recognition module may identify the word "Seabiscuit" as it is the name of one of the participants in the race. The speech recognition module stores the name of Seabiscuit as the last mentioned participant until another participant is mentioned or a pre-registered phrase is identified. When the phrase "on fire" is identified by the speech recognition module, the speech recognition module provides an alert to the server to insert a visual effect corresponding to the phrase "on fire" for the avatar corresponding to Seabiscuit. Example techniques for converting utterances to machine understanding data are described in U.S. Pat. Nos. 10,347,240; 8,374,871; 8,583,416; 9,430,467; and 9,324,327; these and all other extrinsic references are herein incorporated by reference in their entirety.

In at least some embodiments, the physical race track where the real race is taking place is equipped with a plurality of sensors for sensing the position of every horse during the race, and the readings of such sensors are processed and transmitted as race update messages.

In at least some embodiments, each horse may be assigned a unique Radio-Frequency Identification (RFID) tag which can be read by a plurality of sensors around the race track. The RFID tag may be passive and provide an RFID reader an indication as the horse passes by the RFID reader. Alternatively, the RFID tag may be active and provide an RFID reader an indication as the horse passes by the RFID reader. In some cases, an active RFID tag may continuously provide indications to a plurality of readers and the plurality of readers may combine their readings for determining a position of the horse based on triangulation.

Alternatively, each horse may be equipped with a positioning subsystem such as a Global Navigation Satellite System (GNSS) receiver which may be, for example, a Global Positioning System (GPS) receiver (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

In at least one embodiment, an image recognition system may be trained and/or programmed to recognize each horse and rider based on one or more of the following: a number corresponding to the horse displayed on the horse's saddle and/or the jockey's armband, back, or helmet; the rider's uniform color and pattern, the horse's color, size, leg length, head and/or body shape, jockey size, jockey uniform, jockey helmet, etc.

According to at least one embodiment, each horse may have a unique marker which can be picked up by specialized cameras. The unique marker may be adapted to reflect visible or non-visible light (e.g., infrared, ultraviolet, etc.) and the specialized cameras may be designed to detect the specific light wavelengths reflected by the marker.

According to at least one embodiment, each horse may have a plurality of markers to be picked up by specialized cameras at specific locations on the horse's body. Each marker may include patterns to be uniquely identified by cameras and the patterns may be registered with a video analysis software to allow the video analysis software to be aware of each marker's identity. For example, each horse may have a marker on its nose, on its back, and on each of its legs. This may allow the video analysis software to know the location of each horse's nose, back, and legs. Other locations on the horse's body may also be used and this example is not intended to limit the scope of the present disclosure.

In such an embodiment, update messages may provide location information for each such marker on a horse. For example, instead of an update message comprising the information illustrated in Table 2, above, the update message may comprise coordinates for each marker on the horse. In one embodiment, a first set of coordinates may be the absolute coordinates within the venue for a predetermined marker (e.g., nose) and subsequent coordinates may be expressed as vectors relative to the first set of coordinates. In some cases, when a marker is not visible to the camera, a predetermined vector (e.g., [0,0]) may be transmitted and a reasonable estimate for that marker may be inferred by the client device based on the coordinates for the other markers on that horse.

The client device may then use a wire frame model of a horse running to more accurately depict the movement of the real horse by the digital avatar. Specifically, the position of every marker on the real horses may be mapped to a point on the wire frame, and the wire frame may be animated by moving the points in accordance with the movement of their corresponding markers.

The movements of the markers for a given horse relative to each other may also be used to identify specific movements or special events within a race. For example, if the markers for the legs are above the marker for the back, the client device may determine that this horse has fallen, and may depict an animation designed for that purpose. Other events may be identified in this manner and other actions by the client device may be taken upon identifying such events.

Other types of sensors for determining the location of horses are also contemplated and the present disclosure is not limited to any one type of sensor.

Regardless of the type of sensors used, the position of the horse may be determined with varying degrees of accuracy. In particular, each sensor may measure a position of the horse on the racing track where the racing track is reduced to a one-dimensional space extending from the starting line to the finish line. Therefore the reading from a sensor is a single value representing a coordinate of the one-dimensional space. This value may be provided to the client device in a format that is recognized by the client device.

Alternatively, in particular when cameras are used to determine the position of horses, the position of a horse may be expressed as coordinates in a two-dimensional space representing the surface of the race track or a three dimensional space when including features such as the relative position of the legs of the horse, among other options. In this case the reading from a sensor is a pair of values corresponding to each dimension of the race track. These values may be provided to the client device in a format that is recognized by the client device.

Alternatively, server 420 may receive a video feed of the race, and analyze the video feed in real time to determine the position of every horse at predetermined intervals. The analysis of the video feed may be simple, such as for example determining the position of each horse in the race. Alternatively, the analysis of the video feed may be more complicated, and involve detecting detailed movements of each horse. According to at least one embodiment, each horse may have a dedicated camera trained on the horse providing a constant video feed of the horse throughout the race.

Server 420 may then obtain the position of each participant in the race. As the server is aware of the identity of the participants using any of the various means described above, the server may generate update messages including the participant identifier to allow the client device to map what the real world participants are doing to their respective avatars.

Video feed analysis may be used to detect the specific rate of gallop of each horse and the moment each stride is taken. This information may then be used to model the movement of an avatar based on a wire frame movement of a horse.

For example, in one embodiment, a client device may have preprogrammed in its memory a wire frame movement of a horse galloping. This movement may be modified based on certain parameters, such as stride length, stride duration, amongst others. Video analysis of a real horse running may be performed to identify each parameter for configuring the wire frame movement. The parameters may then be transmitted to the client device in a race update message to allow the client device to display an avatar performing the wire frame movement as configured by the received parameters.

In some cases, the video analysis may also identify other movements such as head movements by the horse, and such head movements may be expressed as parameters, which are transmitted to the client device and reproduced on the avatar. For example, a head movement may be characterized by a starting time, a finishing time, a direction, an amplitude, or other factors. Head movements may be identified using the system described in U.S. Pat. No. 10,572,724 to Wnuk et al.

When the avatar is a representation of something other than a horse, the wire frame movement of the horse gallop may be converted to a wire frame movement suited for this particular avatar. For example, if the avatar is a dragon, the length of the legs with respect to the body may be shortened, amongst other modifications. In this example, the horse wire frame movement is converted to a dragon wire frame movement, for example for wing movement, which may be configured according to the same parameters as the horse wire frame movement, for display on the client device. More specifically, the gallop rate might convert to the dragon wing beat rate, the head movement of a horse could map to the head movement of the dragon or even breathing fire. Thus, the inventive subject matter is considered to include mapping physical attributes or actions of event participants to one or more virtual event participants or actions (e.g., one-to-one mapping, one-to-many mapping, many-to-many mappings, etc.).

Figure 6:
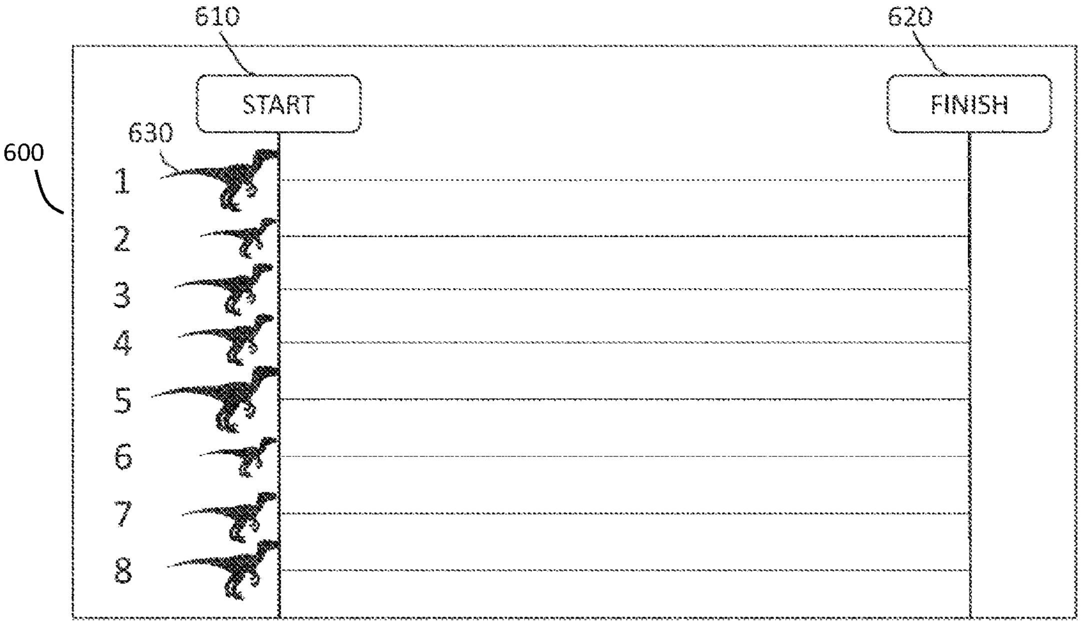
FIG. 6 is an illustration of a user interface according to at least one embodiment of the present disclosure.

According to another embodiment, the avatars for the horse race are not horses, but something else. For example, the avatars may be dragons, dinosaurs, cartoon characters, vehicles, or any other type of avatar that may be entertaining to a user. FIG. 6 is an example of a race being displayed with dinosaurs as avatars. As in the case of FIG. 5, FIG. 6 portrays a user interface 600 with a starting line 610 and a finishing line 620. While each avatar 630 in FIG. 6 is the same, in some embodiments each avatar may have distinctive features.

A user interface may allow the user to select avatars for the race from a plurality of options. For example, before the race starts the user may be presented with a number of types of avatars to be used in displaying the race. According to at least one embodiment, the avatars may be animated, such that they appear to be running as they are moving. In some embodiments, the mapping between avatars and the real world event participants need not be one-to-one. For example, a single horse in a horse race could be represented by a flock of birds. Alternatively, a hockey team may be represented as one avatar participating in a tug-of-war.

Alternatively, a user interface may be provided to allow the user to select a custom avatar for all or a subset of horses. A custom avatar may be based on an image file such as a JPEG or PNG, or other textures, format that provides a digital skin for the avatar.

In at least some embodiments, more details can be provided to the client device to create a more realistic user experience. In addition to position information for each horse, each race update message may comprise optional additional information. For example, a race update message may indicate whether a horse has fallen or stumbled or whether some irregular event occurred.

In at least some embodiments, a number of preset irregular events which are known to occur in a horse race (or in another type of event) may be associated to a code which may be transmitted in a race update message. For example, a horse falling may be associated to a code and when a horse falls in the real race the next race update message may include this code in association with the proper horse identifier. Upon receiving a race update message where this code is included in relation to a horse identifier, the client device may display an animation of the corresponding avatar falling. When the virtual event is a different kind of event, other suitable animations may be displayed. It should be appreciated that the inventive subject matter is considered to include construction of event-based protocols, where observed real-world events are recognized and assigned a code. The code is then transmitted to the remote device. The remote device receives the event code and constructs a corresponding avatar virtual event. Techniques for recognizing events or activities are described in U.S. Pat. No. 9,547,678 to Wnuk et al. titled "Activity Recognition Systems and Methods", filed Jun. 17, 2015.

Any number of irregular events may be coded as described above and made to correspond with an animation in the virtual event.

In at least some embodiments, race update messages may also include information on velocity and acceleration of each horse, which the client device can use to provide a more realistic experience to a user.

In at least some embodiments, a real race may be presented as some other kind of event. For example, a race may be presented as a battle royale, with each horse in the race corresponding to an avatar participating in the battle against every other horse in the race. For example, each horse could be presented as a fantasy elf, orc, monster, or other type of avatar. In this exemplary, non-limiting embodiment, the position information of each horse in the race received by the client device may be used to update a health bar for every avatar, such that the level of health for every avatar in the battle is based on its current position in the race and how much of the race is left to complete.

For example, early in the race, a horse may fall behind, and this will be reflected as a diminished health level on his health bar. The appearance of the avatar may also include bruises and injuries to reflect the diminished health level. However, being early in the race the health level of the avatar is not too greatly affected in order to reflect the fact that the horse still has time to catch up to the other horses. As the race progresses, horses that are behind see their health level diminish even more to reflect that catching up to other horses is ever more unlikely. As a horse crosses the finish line to win the race, the other avatars will have their health bar reduced to a zero level. This may be accompanied with each losing avatar appearing to be knocked out.

The above examples are provided for illustrative purposes only. As a general principle, any real world event may be portrayed using avatars participating in the same or a different kind of virtual event. Any type of virtual event is contemplated by the present disclosure as long as the results of the real world event may be mapped to the results of the virtual event.

In some cases, various parameters of the real world event may be tracked and mapped to corresponding virtual parameters. For example, a boxing match, horse race, car race, political race, economic indicator, stock index, commodity price, or other real world parameter may be represented by an initial representation, such as a number (e.g., a vote total, a point total, a probability, a dollar value, a speed measurement, a rank relative to other competitors, etc.). These initial representations in turn may be combined from different activities, events, groups or persons, such as through addition, averaging, ratios, sorting, filtering, or other operations to generate derivative representations. The initial representations and/or derivative representations may then form the basis for the mechanics of the virtual representation using avatars.

For example, the relative positions of a horse race may be used to illustrate statically or dynamically generate an animation of a car race with corresponding cars having the same or proportional positions as the horses in the real world horse race. In other embodiments, one or more statistics associated with one or more horses in horse races, athletes in sports (e.g., basketball, tennis, hockey, boxing, MMA, weightlifting, etc.), competitions, etc. may be used to determine an aspect of the virtual representation using avatars (e.g., race position, relative climbing height, size of avatar, color, brightness, health meter, avatar attribute, etc.). The virtual representation using avatars may be distinct in appearance from the original source of the statistics (e.g., a horse race may be represented by a car race, a dragon race, a fight between knights, etc.) For example, a better race position in the real world may correspond to relative dominance within a virtual fight, such as having greater aggression, successful hits, and/or better health, which may be represented by animations, speed of movement, or indications of damage. Additional options are described in greater detail below.

According to yet another embodiment, the appearance of the avatar is modified according to the odds assigned for a particular horse. For example, the horse with the greatest odds of winning may be assigned an avatar of a strong and powerful horse (or dragon, etc. . . . ), while the horse with the lowest odds of winning may be assigned an avatar of a donkey (or a small dragon, etc. . . . ). Other horses may be assigned avatars with an appearance which is proportional to their odds. This is illustrated in FIG. 6, where each avatar has a different size, based on the odds of the horse to which they are mapped.

Other types of modifications to the avatars may comprise modifying any of the physical features of the avatars. For example, an avatar associated to a horse with good odds may be portrayed as a beautiful, athletic, and healthy horse, whereas a horse with bad odds may be portrayed as injured, sickly, and disheveled.

Alternatively, other features may be modified. For example, an avatar associated to a horse with good odds may be portrayed as having a brilliant light source emanating from behind the avatar. As the odds of the horse worsen, the light source emanating from behind the corresponding avatar may become dimmer and dimmer.

Furthermore, whereas FIGS. 1, 5, and 6 all show a linear track, this is only for illustrative purposes. Other types of tracks such as an oval track or the like are within the scope of the present disclosure. For example, where a horse race is represented using dragon avatars, the virtual race may occur in the sky, where the race track is represented by a series of hoops for the dragon avatars to go through in a 3 dimensional space. This could even be shown as an Augmented Reality (AR) event at a different race track, rendering 3 dimensional avatars on a different track, allowing the user to look through their device and see a representation of the event, or rendering a 3 dimensional AR representation of the event in the users home. The update information that is being sent to the user for an AR avatar representation may have geo location coordinates sent, an avatar orientation vector representing the up direction and size of the avatar, and a vector representing direction of travel and speed. Similarly, where a horse race is represented using car avatars, the race track may be displayed as a road, or a car race track. Other race tracks corresponding to any conceivable type of avatar may also be used without departing from the scope of the disclosure. Generally, a race track may be selected based on the type of avatar.

One way to optimize the size of the data packets that are sent to the user, especially when the user's device is a mobile device, is through the use of vectors. There can be an initial vector set to the device to setup the map or virtual representation of the environment, this vector would be the representation of an avatar orientation vector AO (AvatarOrientation) made up of (X,Y,Z) representing the up direction or the facing direction of the avatar and the magnitude of the vector could be used to scale the avatar to its desired size. A second vector that could be used is AIL (AvatarinitialLocation) this would give the initial location of the avatar made up of X,Y,Z for pure virtual environment or for an AR geo location environment this might be a location on a specific S2 cell for the location of an AR avatar starting in the real world that the avatar will be rendered. The device can use the information from these two vectors to place the avatar in their environment for the user to see, and load any other information such as the surrounding S2 cell information for the race. Once the race starts only one vector can be sent to the device for the avatar representing the direction of motion and the distance the avatar is moving AM (AvatarMovement) made up of X,Y,Z giving the direction of the motion from the initial location. This would be a much smaller vector compared to a geo location vector. Each of these vectors would be sent for each avatar for every update in initial setup. Each avatar would have multiple local attributes to have their current state saved on the device, such as current location vector ACL (AvatarCurrentLocation) X,Y,Z or the AO vector. To get the new location of the avatar one would need just take ACL vector and add the AM vector this would give you the new current location of the avatar.

Two or more events can be combined to create a new event or an event that is occurring within an existing real event. This could be represented as a top down view on the device and the races could interfere with each other causing some avatars to be pushed back or blocked. For example a user at a live horse race event, could also see another event occurring within the race, such as a virtual race in the opposite direction on the same track, the user could watch the race via an AR device and see the avatar based race live on the existing track but this might be a RC car race occurring at the track but in the opposite direction and the real event would interfere with the virtual avatars blocking and knocking them out of the way, the driving factors for the RC cars could be AI based avatar or it could be the events of another real world event such as the car from a Nascar race events being used as input for the RC car avatars. The collisions and blocking that can occur between the avatars and the real world participants could create a completely different result than either one of the real world events. This is just one example of how two heterogeneous events being combined, there are many other types of events that can be combined such as a football and a hockey game as an input for an avatar based soccer game, is just one additional possibility, there are many different ways of combining two events and only some possible examples are shown here but many other are possible.

The view presented for the virtual simulation is thus not limited to any particular view by the present disclosure. For example, in some cases the avatars may be seen from an overhead perspective and the shape of the racetrack may be reflected on the display. In other cases, the race may be displayed from the perspective of a selected avatar, where avatars ahead of the selected avatar may be visible and a relative position shown. A graphics processor on a client device 410 could create such display based on information about the environment (whether the real or virtual environment) and the position of other horses. Other examples for the display of the event on the client device 410 are possible.

In at least some embodiments, other types of events may be broadcast as described above, and be depicted as a race, or another type of sporting event. For example, an election may be represented as a race, with the number of votes, electoral college, house seats, senate seats, or the like being used to update the display according to the nature of the avatar-based representation. For example, the difference in number of votes could be represented as a difference in hit-points of two battling sorcerers. Thus, it should be appreciated that attributes of a real-world event feature can be transformed to a virtual feature even if the virtual feature has a different modality.

Figure 7:
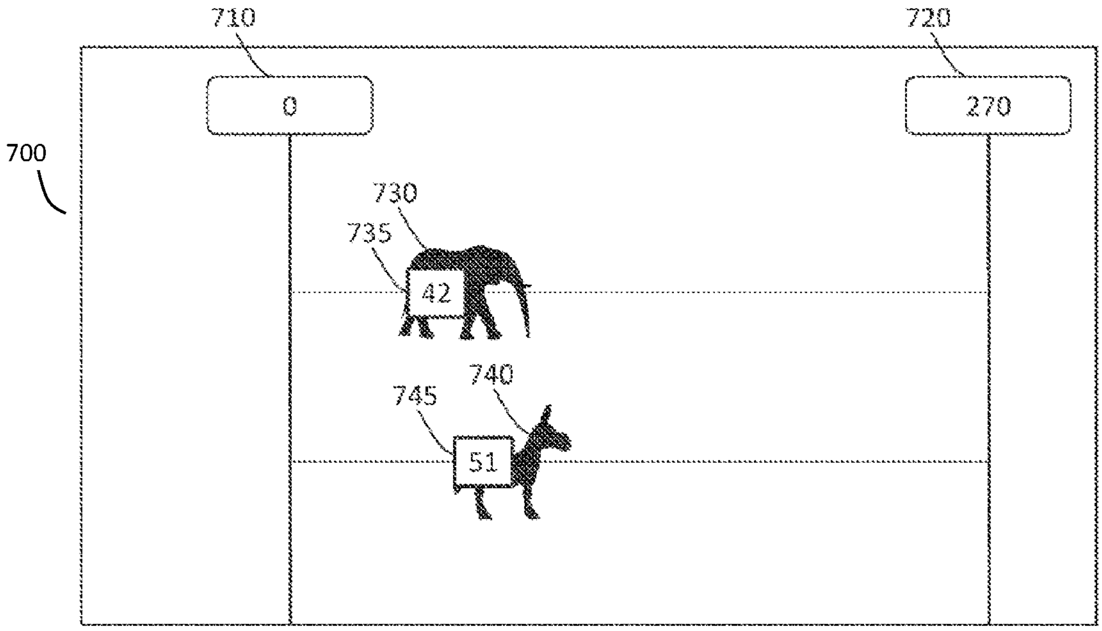
FIG. 7 is an illustration of a user interface according to at least one embodiment of the present disclosure.

One such embodiment is shown with respect to FIG. 7. In the example of FIG. 7, an American presidential election is tracked by way of an elephant avatar 730 and a donkey avatar 740. As can be seen in user interface 700, the starting line 710 and the finishing line 720 are labeled with each candidate's starting number of electoral college votes and the number needed to win, respectively.

Notably, each avatar, 730 and 740 are moved along their respective track in proportion to the number of electoral college votes they have won up to this point. Optionally, this number may be displayed as indicators 735 and 745.

During the election, the client device may receive messages from a server whenever a new result is available, and update the interface 700 based on the new result. As an election happens very slowly in comparison to a horse race, update messages may only occur very sporadically.

While FIG. 7 illustrates an embodiment directed to the displaying of an American presidential election results, other types of elections could be displayed with minor changes that are within the purview of a skilled person.

As in the case of a horse race discussed above, an election need not be presented as a race. For example, the election may be displayed as a tug of war, boxing match, knights dueling, a picture gaining features, and the like.

In yet another embodiment, different types of sporting events may be broadcast using the technology of the present disclosure. Technology exists to track the movement of, e.g., hockey players on a hockey rink, as well as movement of the puck. For example, each player may have on their jersey or their helmet a marking which identifies them and which can be picked up by a plurality of cameras positioned around the hockey rink. A similar marking may be placed on the puck. This allows to easily digitize position data for every player and the puck.

Figure 8:
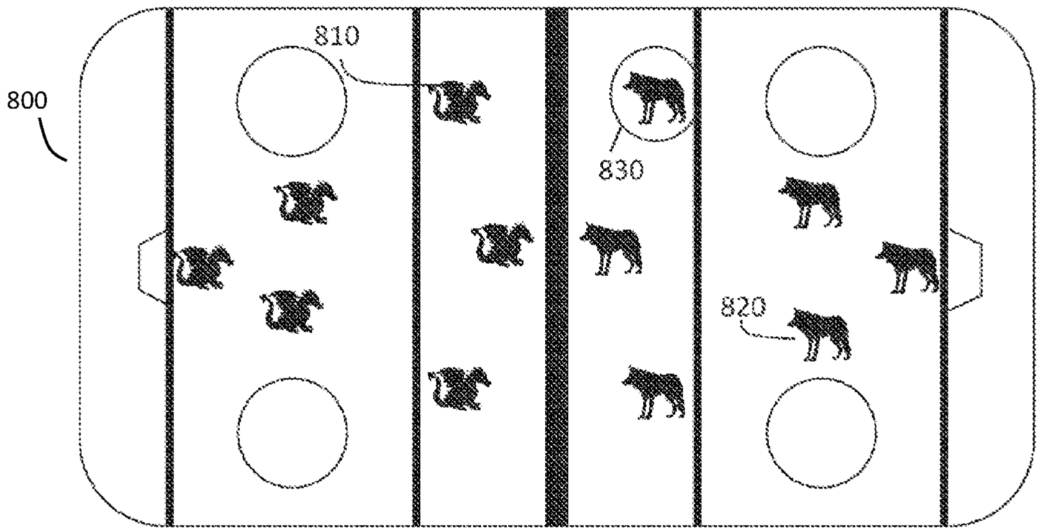
FIG. 8 is an illustration of a user interface according to at least one embodiment of the present disclosure.

Reference is made to FIG. 8, which illustrates a user interface 800 for displaying a hockey game according to the present disclosure. The user interface 800 looks like an ice hockey surface and includes avatars 810 that look like dragons, and avatars 820 that look like wolves. In this embodiment, dragons 810 are on one team, and wolves 820 are on the other team. In other embodiments, avatars representing players from different team may be the same, but wear different jerseys, be displayed in different colors, or be distinguished from each other in another suitable manner. Alternatively, every avatar may be different, but avatars representing players of one team may wear the same jerseys, or be displayed in the same color, or have some other characteristic identifying them as belonging to the same team.

In some embodiments, where the identity of the players represented by each avatar is known, an indicator may be displayed on or near each avatar. The indicator may comprise a player number, or the player name, or other identifying information.

Figure 9:
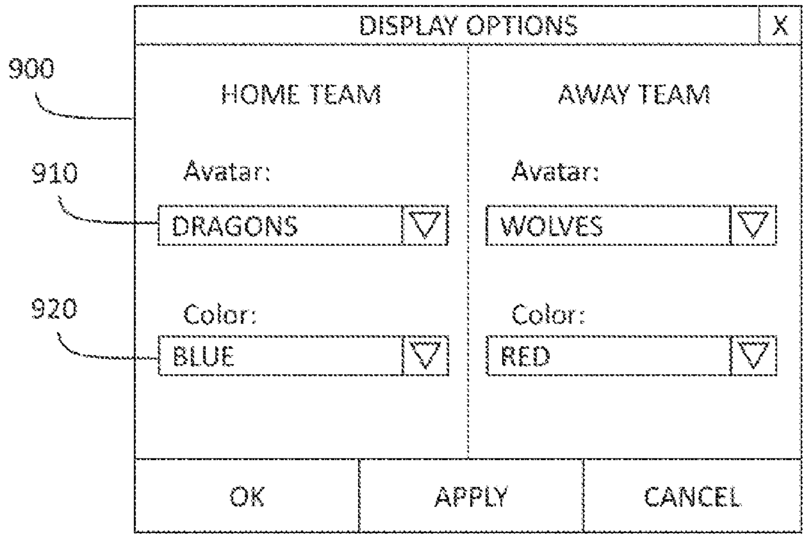
FIG. 9 is an illustration of a user interface according to at least one embodiment of the present disclosure.

A user interface may be provided allowing the user to select avatars and other display options. Such an interface is shown with respect to FIG. 9. As seen in FIG. 9, a user interface 900 provides an avatar selection element 910 and a color selection element 920, for each of the home team and the away team. Other display options may also be included.

User interface 900 may be presented to the user prior to the presentation of the game, or during the game.

Returning to the user interface of FIG. 8, in some embodiments, the puck may be represented by indicator 830. In this embodiment, indicator 830 is a circle around the avatar representing the player in possession of the puck. However, other options are possible and the present disclosure is not limited to this embodiment. In some embodiments the puck indicator may be a depiction of an actual puck. Further, when the puck is not in the possession of any particular player, the puck may be depicted as an actual puck.

Again, while a real hockey game may be presented as a virtual hockey game, the present disclosure is not so limited. For example, a real hockey game may be represented by a tug of war. In such an embodiment, the position of the players may be ignored and only the score and the time remaining may be used to update a display of a virtual tug of war. A goal may result in the scoring team pulling the rope successfully by an increment. Similarly, as the time remaining gets closer and closer to the end of the game, the team with the most goals will be represented as successfully pulling the rope by an increment until victory is achieved when the game ends. Other ways to display a hockey game are also within the scope of the present disclosure.

As will be appreciated, while the embodiment of FIG. 8 illustrates a hockey game, other sports such as basketball, football, baseball, soccer, tennis, and the like could be depicted in a similar manner. In these scenarios, the puck indicator would be replaced by a ball indicator. In one non-limiting example, a basketball game may be represented as a virtual race, where the position of the avatars within the virtual race is based on the score of the basketball game. Similarly, a golf tournament may be represented as a battle royale, where each real golfer is mapped to a virtual wrestler and each golfer's score is proportional to the amount of damage suffered by the corresponding virtual wrestler. As a further example, a poker tournament may be represented as a climbing race, where each poker player is mapped to an avatar climber and as their chip stacks increase they move towards the top of the mountain and as their chip stacks decrease they fall down a proportional amount. The above are provided as illustrative examples and are not intended to limit the scope of the present disclosure.

During the game, a user may watch the game on a client device connected to a server as illustrated in FIG. 4. As in the case of a horse race, the server 420 may provide continuous updates to client device 410 during the game. In an embodiment where a hockey game is presented, each update message may contain the information shown in Table 3.

TABLE 3

| Avatar ID | Position |
|---|---|
| 0 | x, y |
| 7 | x, y |
| 13 | x, y |
| 4 | x, y |
| 31 | x, y |
| 18 | x, y |
| 10 | x, y |
| 22 | x, y |
| 29 | x, y |
| 38 | x, y |
| 9 | x, y |
| 18 | x, y |
| 28 | x, y |

As seen in Table 3, a first entry in an update message provides a position for an avatar with an ID of 0. In this embodiment, the ID of 0 is reserved for the puck. However, other ways of indicating the position of the puck are within the scope of the present disclosure.

The update message further comprises position information for up to 12 avatars. In this case, position information includes x and y coordinates, because unlike a horse race, where position information is unidimensional, a hockey game is played on a two-dimensional surface. As a video feed of the game is analyzed as described above, the position information of every player on the ice is extracted and provided in an update message. In some embodiments, the update message may further provide speed or acceleration information for every player.

Coordinates may be transmitted based on the position of the players within the real venue and converted to virtual coordinates for use within the virtual venue at the client device using a transform designed for that purpose. For example, where as a real venue may be a rectangle of 200 feet by 85 feet, a virtual venue may have different proportions or be a different shape entirely. The client device may apply the transform to received coordinates to obtain the proper virtual coordinates. In some embodiments the virtual coordinates may be expressed as cartesian coordinates, radial coordinates, or other suitable form. The client device will be made aware, by way of a configuration message from the server, of the dimensions of the real venue and of the coordinate system used to identify locations of the real venue. In this manner, the client device may be configured to know the coordinates of the four corners of the real venue (in the case the real venue is shaped like a rectangle. With this information, the client device may compute a transform function to transform real coordinates into virtual coordinates.

In some embodiments, a special position marker may be provided for players who are on their respective team bench.

Alternatively, position information is only provided for players on the playing surface. As a player leaves the playing surface for the bench, the next update message will not contain position information for that player. Similarly, as a player enters the playing surface, the next update message will contain position information for that player.

As the client device 410 receives update messages, the user interface 800 is updated accordingly.

In the case of a hockey game, and other types of sports, some other types of messages may be required to convey information besides the position of the players. For example, messages may be provided to provide information on the time left in a period, the score, whether a goal has been scored, when a penalty is called, how much time is remaining in each penalty, whether there was a stoppage of play and the reason behind the stoppage of play (e.g., offside, icing, etc.), and the like. For other sports, or types of events, other types of messages may be applicable as required.

In at least some embodiments, other types of events may also be provided. For example, if a fight breaks out between two hockey players, this may be conveyed through an update message comprising a code identifying a fight, and identifiers for the players involved in the fight. Typically, a fight in hockey is between two players, but brawls with a large number of players have also been known to occur. Therefore, in one embodiment, a first animation involving two avatars may be presented when a fight involving two players occurs, and other animations involving multiple avatars may be presented when a fight involving more than two players occur. Optionally, a winner of the fight may be declared, or the fight may be a draw, and different animations may be provided in either scenario. Thus, some embodiment comprise a mapping between recognized events or actions to codes, possibly via look up table or a tree data structure. The codes can then be packaged within an update message packet transmitted to edge devices. In response, the edge devices interpret the codes and render a corresponding avatar presentation.

Other events such as hits, puck battles, trips, and the like may also be represented using preconfigured animations with avatars and codes corresponding to each specific type of events.

In some cases, certain events of great importance may be replayed in slow motion or with greater detail. For example, when a goal is scored, as it happens in real-time, it is displayed based on regular update messages comprising player position, puck position, and a goal indicator. During the stoppage of play immediately following the goal being scored, a replay of the goal featuring more details may be presented.

In at least one embodiment, following a goal a goal replay message may be transmitted to the client device allowing the client device to display the goal in a more realistic manner. For example, the goal replay message may comprise the position of the goal scorer as he shot the puck, the type of shot (e.g., slap shot, wrist shot, backhand, etc.), the velocity of the shot, where the puck entered the net, and the position of the goalie as the puck entered the net. With this information, and information on every player's position as the goal was scored (obtained from prior update messages), the client device can replay the goal with greater detail and provide a more realistic user experience.

In at least one embodiment, a goal replay is shown from multiple angles on the client device.

Other types of events may be replayed as described above and the present disclosure is not limited to goal replays.

As in the case of a horse race, an audio stream of play-by-play and commentary may be provided to the client device also, either from server 420 or some other server.

Any of the above embodiments may be modified by introducing a delay between the real world activity and the presentation of the virtual event corresponding to the real world activity. The amount of the delay may vary according to the characteristics of the real world event and the ability of a computing device to quickly analyze video feed of the real world event and translate it into data for the purpose of transmission to a client device. In some cases, a delay may be in the order of 10 seconds, however this is not limiting, and shorter and longer delays may be appropriate in certain circumstances.

The introduction of a delay allows the real world event to be presented as a series of micro-events instead of, or in addition to, merely providing position information for each participant of an event. For example, where the real world event is a baseball game, instead of providing information on the position of the ball for every pitch, each pitch may be analyzed and represented as a micro-event. An update message for a pitch may comprise the following information: pitch-event code, type of pitch, speed, position relative to strike zone, a flag to indicate whether the batter took a swing, and a flag to indicate whether the pitch was called a ball or a strike. Other information may be provided and the above example is provided for illustrative purposes only. As the information for a pitch is received, the client device may provide an animation corresponding to the received pitch information.

Similarly, if during a real baseball game a pitch is hit by a batter, the entire play can be interpreted as a micro event, and provided to the client device upon completion. In one embodiment, an update message for a hit may comprise all information relating to the pitch, information on the type of hit (e.g., grounder, flyball, line-drive, . . . ), direction of the hit, where the ball was caught by a fielder, whether runners on base changed position, where and how the batter was called out, or to which base the batter got to, and any other information that would be useful in displaying the micro-event in the virtual event.

Other sports may also be analyzed as a plurality of micro-events as described above. Each of the micro-events may then be expressed as a plurality of parameters and transmitted to a client device where the client device is programmed to create an animation corresponding to the micro-event. Other information, such as position information for every participant, may be provided in parallel to micro-event information.

According to at least some embodiments, where the real world event is a football game, each play may be analyzed so that the type of play is identified and parameterized to allow a client device to recreate the play on its display based on the type of play and the relevant parameters. Therefore, a football game may be represented as a succession of micro-events. As discussed above, each play may be presented as a micro-event. Further, events in between plays, such as huddles or penalties may also be presented as a micro-event.

In one example, a running play may be represented in a message with the following fields:

TABLE 4

| Field | Value |
|---|---|
| type | running play |
| runner | 27 |
| yards | 7 |
| stoppage reason | tackle |
| defense | 42 |

As seen above, the first field indicates the type of micro-event. In some embodiments, the type of micro-events may be constrained by the real world event. For example, if the real world event is an NFL™ game, the types of micro-event that may be represented in a message are preselected for things that can occur during an NFL game. In the example of Table 4, the type is "running play". The type may be indicated by a character string, or by an index whose meaning is predetermined and known to the client device.

Other fields may be provided to help the client device display the micro-event with greater accuracy. The present disclosure is not limited to any number or type of parameters. However, as more parameters are provided, the virtual presentation of the micro-event can be more accurate. Different types of micro-events may have a different number of parameters, and therefore the format of the message may depend on the value of the type field.

For example, in the example of Table 4, 4 parameters are provided, namely "runner", "yards", "stoppage reason", and "defense". The runner field identifies the player running the ball in the running play. The yards field identifies the number of yards ran by the player. The stoppage reason field indicates whether the play ended on a tackle, or if the runner went out of bounds. The defense field may identify any defense players involved in the play.

Other parameters may be provided. Alternatively, fewer parameters may be provided.

The client device may, upon receiving a message with the information of table 4 show a running play, where the player identified by index 27 runs the ball for 7 yards and eventually gets tackled by the player identified by index 42.

Other types of plays, such as passing plays, may be represented in a similar fashion.

In one embodiment, micro-events are generated by an artificial intelligence engine analyzing a video feed of the real world event. For example, the engine may implement the teachings in U.S. Pat. No. 10,572,724 to recognize various activities by the real world participants. Alternatively, micro-events may be generated by a human operator watching the real world event.

In at least some embodiments, all potential micro-events are pre-registered in a database for a given type of real world event. For example, if the real world event is a football game, different plays may be defined based on the movements of the offensive players. An analysis engine may then try to match the action in the real world event with a pre-registered play. For example, while the above discussed running plays and passing plays, different types of running plays and passing plays may be pre-registered and matched to the action in the real world event. Examples of running plays which may be pre-registered include, but are not limited to "Up the middle", "Off tackle", "Toss", and "Sweep". Examples of passing plays which may be pre-registered include, but are not limited to "Go", "Post" "Flag", and "Arrow".

The above is not limited to football. Most real world activities can be broken down in smaller events which may be pre-registered and recognized. For example, the above may be applicable to figure skating, where a salchow jump or an axel jump may be pre-registered and recognized by an analysis engine.

Further, some micro-events might not be related to the participants in the real world event. For example, rain might start to fall during a Formula One race. A micro-event might be generated when the rain starts, and another micro-event might be generated when the rain stops. In some embodiments, when a micro-event represents a material change in the conditions for the real world event, betting may be opened up during the event, with adjusted odds. For example, in the case of Formula One, a driver may be in $5^{th}$ position when the rain starts to fall, but this driver may be a specialist on wet conditions. Therefore some users may wish to bet on this driver overcoming his opponents due to the sudden change in conditions.

In some embodiments, where an event occurs that is not recognized by the system, a default action may be taken. For example, if a player is severely injured on the field and the medical team is called up, the system may not be able to recognize the event automatically. Other unusual events may occur that disrupt the flow of the real event. Furthermore, many real events include pauses in the action for commercial breaks or intermissions between periods of play. In these situations, the client device may take any number of actions.

For example, the client device may display advertisements, provide a message to the user that action will resume shortly, or present a game for the user to play. The game might be a stand-alone game or a multi-player game involving other users of the system.

Other types of micro-events are also contemplated by the present disclosure.

In some embodiments, instead of communicating with a client device, a server may create a video of a virtual event, as it would be presented on a client device as described above, and live-stream it on a streaming service, such as for example YouTube™, Twitch™, and the like. In this case, the term "live" from "live-stream" does not necessarily indicate that the virtual event is presented in real-time with respect to the real world event, but rather that it is presented as it is generated by the server, even if there is some delay with respect to the real world event.

In yet other embodiments, users of a client device may place bets on whether certain events take place within the virtual event. As discussed above, a real event takes place in the real world in a real venue, and this real event is depicted as a virtual event in a virtual venue, where participants of the real event are depicted as avatars in the virtual event. In some embodiments, virtual objects may be placed within the virtual venue and can interact with avatars.

For example, when the real event is a football game, and the virtual venue is a virtual football field, a plurality of virtual gemstones and virtual treasures may be placed throughout the virtual football field. As avatars step on such virtual objects, they may be awarded the virtual objects themselves or points corresponding to each virtual object. Users may then place bets on which avatar will collect the most points, or which avatar will collect individual gemstones.

As a non-limiting example of the above, a plurality of virtual diamonds may be placed on a virtual football field during a virtual presentation of a real football game according to the present disclosure. Each time a diamond is stepped on by an avatar, the avatar is awarded 10 points. A user may place bets on whether a selected avatar will collect at least 100 points. Alternatively, a user may place a bet on whether a selected avatar will collect more points than any other avatar, or more points than a second selected player. Alternatively, a user may place a bet on whether a specific virtual object will be collected by an avatar. Other types of bets are also contemplated to be within the scope of the present disclosure. Such approaches can be achieved through the use of one or more software tools that are configured to map real world data to a virtual environment in which the avatars will exist. As events are identified or other real-world conditions or criteria are satisfied, the mapping tool will place corresponding virtual features and/or render corresponding virtual events.

In some embodiments a virtual object may disappear once it has been collected by an avatar, and in other embodiments, the virtual object may remain for the duration of the virtual event regardless of whether it was ever collected or stepped on by an avatar.

In some embodiments, virtual objects are randomly positioned. In some other embodiments, virtual objects are positioned in locations where an event of significance occurred previously. For example, if a tackle occurs during a football game, a virtual object may be placed at the location of the tackle.

In yet other embodiments, virtual objects are positioned in predetermined locations on the virtual field. In the latter case, this allows for greater odds for some bets. For example, in the case of the real world event being a hockey game, it is highly unlikely that a goaltender will venture far out of his crease, but not impossible. If a virtual object is placed near the middle of the ice, it is quite likely for a skater to step on the virtual object at least once during the game, but highly unlikely for the goaltender to do so. Therefore, a bet on the goaltender stepping on that virtual object may return much greater odds than the same bet made with respect to a skater.

In at least some embodiments, such bets may be placed using an application running on the client device as when bets are placed on the real world event, as described above. During the depiction of the virtual event, a short animation or visual effect may alert the user when the conditions for a bet placed by the user are met.

Other bets which are based on any conceivable statistic of the real world event may also be placed using a client application on the client device. For example, in NHL™ games the time of possession (of the puck) for each team is not an officially tracked statistic, and therefore could not be the subject of a bet. However, when an NHL™ game is depicted as a virtual event according to the present disclosure, time of possession for each team or each player may be tracked automatically. This allows for bets to be placed on such metrics.

As a non-limiting example, a user may place a bet that the home team will have possession of the puck for more than 30 minutes during the game. Other types of bets in other sports based on metrics which can be computed from the depiction of a virtual event are also contemplated to be within the scope of the present disclosure.

In yet a further embodiment, multiple real world events may be depicted as a single virtual event, allowing users to place bets on the outcome of the single virtual event. Generally, at least one aspect of a first real world event and at least one aspect of a second real world event are used to generate a virtual event. In some embodiments, more than two real world events may be combined in this manner.

Preferably, each real world event which is combined occurs simultaneously, although the present disclosure is not so limited.

According to one non-limiting example of the above, the first real world event is a basketball game, the second real world event is a hockey game, and the virtual event is a battle between two armies. Each team of the basketball game is mapped to one of the two armies, as are each team of the hockey game. Therefore, each army is mapped to one basketball team and one hockey team.

The battle between the armies is based on what happens during the basketball game and the hockey game. For example, each army may be composed of 100 soldiers at first. As a basket is scored by a team in the basketball game, 1 soldier from the opposing army is killed off. Similarly, every time a shot on goal is taken in the hockey game, 1 soldier from the opposing army is killed off. When a goal is scored, 5 soldiers are killed off. When an army is completely killed off, the other army wins and the virtual event may end, regardless of whether the real world events ended. Alternatively, at the end of the real world events, the army with the most remaining soldier wins.

As a further example, the effect on the virtual event from each of the real world events may be different. Therefore, the above example may be modified so that when a shot is taken during the hockey game, instead of a soldier from the opposing army being killed off, each shot taken adds a soldier to the corresponding army, and each goal scored builds a fortress around the corresponding army which must be destroyed before any soldiers can be killed.

In yet a further embodiment, points scored on the basketball game may cause the attributes of the corresponding army to improve. For example, each army's soldiers may have a strength attribute, where the greater the soldier's strength, the more likely an attack from that soldier will succeed. In this embodiment, each shot from the hockey team may cause one attack from each or from a selected soldier of the corresponding army. As a non-limiting example, the probability of an attack killing an enemy soldier may be the strength value divided by 100, where the strength value is a number between 1 and 100.

In some cases, the multiple real events on which a single virtual event is based may have different starting times. For example, in the example above the basketball game may start at 7 pm and the hockey game may start at 10 pm, such that the basketball game will likely be over by the time the hockey game starts. In such a case, betting may be allowed prior to the first event (e.g., basketball game) with certain odds. Betting may then be closed during the first event, and opened again after the first event but before the second event, assuming the second event is not started prior the end of the first event. In this case, the odds may be adjusted based on the outcome of the first event. In particular, the outcome of the first event may increase or decrease the probability of an outcome in the virtual event, and the odds can be adjusted to reflect this increase or decrease.

In at least some embodiments, odds may be offered by third party bookies. Alternatively, odds may be offered by an operator of the system of the present disclosure, or by an exclusive partner. The system may provide each bookie providing odds with real time betting information from bets received by the system in order to allow each bookie to adjust the odds being offered and to ensure that the received bets are within an acceptable limit considering the bookie's reserve funds. This information may be provided upon request by a recognized bookie or automatically to every recognized bookie.

A server of the present system may provide further tools to assist bookies in providing odds to users of the system. For example, for any one event, odds published by others may be published or made available to bookies recognized by the system. For bets about the outcome of an event between two teams or two participants (e.g., tennis match, football game, etc. . . . ), odds may be provided as a "moneyline".

A moneyline is expressed as a positive number and a negative number. Typically, the positive number is the amount won from a $100 bet, and the negative number is the amount that should be bet in order to win $100. For example, if an NBA™ game between Milwaukee and Denver, the odds may be +108 for Milwaukee and −127 for Denver. This means that a $100 bet on Milwaukee will result in winning $108 if Milwaukee wins the game, and a $127 bet on Denver will result in winning $100 if Denver wins the game. Other form of odds are also contemplated by the present disclosure. For example, as discussed above, in a horse race every horse is associated to odds which are represented as a positive number, and the payout is the odds multiplied by the amount bet.

In cases where the system provides users the ability to bet on scenarios for which no odds are published, the system may provide recognized bookies with statistical information that can be useful in calculating odds. Specifically, when an aspect of an event is combined with other aspects of other events to create a virtual event as discussed above, statistical information about each relevant aspect may be provided. For example, if a relevant aspect is a number of points scored, a probability distribution of the number of shots taken for the each team may be provided. Within the context of the present disclosure, a probability distribution is a mathematical function which takes as input an outcome and provides as output a probability. In some embodiments, a probability distribution is a normal distribution and it is provided by two parameters, namely the mean and the standard deviation. However, other forms of probability distributions are contemplated to be within the scope of the present disclosure.

Different granularities may be provided to bookies of the system. For example, if a selected statistic from a real world event is used for betting, the probability distribution for that statistic for the relevant team during the current year may be provided. Alternatively, the probability distribution for that statistic across all teams during the current year may be provided. Alternatively, the probability distribution for the relevant team when facing that specific opponent during the last two years may be provided. Other probability distributions may be provided and the above are provided as non-limiting examples only.

In general terms, any aspect of a real world event may be combined with any aspect of other real world events to construct a virtual event. Users may be able to place bets on the ultimate outcome of the virtual event using a client application running on their client device as discussed above.

Embodiments of the present disclosure may be implemented as a library of functions and classes, or as an Application Programming Interface (API), which may be incorporated into existing programs such as video games and in particular massively multiplayer online games, like World of Warcraft™ EVE Online™, No Man's Sky™, Pokemon Go™, and Fortnite™, for example.

In one embodiment, a stadium could be included in such a video game where a user, through his video game character may go watch a virtual event which is a representation of a real world event. Typically, such games include a map feature, which indicates where things are in the virtual world of the video game. The location of the stadium (or other event venue) could be indicated on the video game map with a special icon. Further, such games may also include a smaller version of the map which is always visible during play, which illustrates the surroundings near the player's character. The smaller version of the map may also indicate the direction to important landmarks with icons placed on the periphery of the small map. In video games providing this smaller version of the map, the location (if near the player's character), or the direction of the stadium or venue may also be indicated on the small map.

The virtual event may be shown from within a computer game may then be streamed on services such as Twitch.tv™ or other similar streaming services.

In this scenario, the programming library or API may simply provide the main video game code with update messages comprising information about positions and micro-events as discussed above, leaving the main video game the responsibility to create animations based on this information. Alternatively, the programming library or API may provide the main video game with two or three-dimensional movements to be applied to avatars created within the main video game.

As will be appreciated, the programming library or API may be used in other types of computer software and the present disclosure is not limited to video games.

In yet further embodiments, the real world event represented as a virtual event may be a video game itself. For example, the real world event may be a game of Fortnite™, or another multi-player game. In at least some embodiments, at least one relevant statistic of the video game is mapped to an aspect of a virtual event.

A non-limiting example of the above could include the number of kills for a team being mapped to a virtual horse race. Specifically, Fortnite™ allows a game mode where different teams allow players to shoot at each other until a team has reached a predetermined number of kills. As each team registers a kill, their virtual horse may move proportionally closer to the finish line.

Other game modes may be mapped to different virtual events. One game mode of Fortnite™, called "Battle Royale" could be mapped to a wrestling battle royale, where each participant of the Fortnite™ game is mapped to a virtual wrestler. As a participant in the Fortnite™ game is killed, the corresponding virtual wrestler is thrown out of the virtual ring.

As in the case of other types of real-world events, when there is commentary available for a video game, it may be provided along with the presentation of the virtual event. In some embodiments, commentary from multiple sources may be combined in a single audio stream. For example, where each participant of the video game can speak into a microphone, the audio from each participant may be provided as a combined audio stream for the virtual event.

The above are provided as non-limiting examples and other mappings between game modes and virtual events are intended to be within the scope of the present disclosure.

As seen from the above, in general terms any real world event may be expressed as a series of micro events and a set of parameters. The types of micro events and the set of parameters may be selected to represent the real world event in precise detail (high granularity), or to present a general overview of the main outcome of the real world event (low granularity).

As the granularity of the presentation of the real world event decreases, the real world event may be mapped to more and more different kinds of events. For example, as discussed above, a hockey game may be presented as a virtual tug of war, but only the goals and the clock running down affect the presentation of the virtual tug of war.

Generally, any real world event may be mapped to any type of virtual event when participants of the real world event can be mapped to avatars in the virtual event and outcomes of the real world event can be mapped to outcomes of the virtual event. The mapping between real world participants and avatars need not be a one to one mapping, but it may be a one to one mapping. Similarly, the mapping between outcomes of the real world event and outcomes of the virtual event need not be one to one but may be.

During the presentation of the virtual event, micro-events of the real world event may be represented as micro-events of the virtual event. As used herein, the term "micro-event" is used to refer to a significant occurrence within the larger event. For example, goals in a hockey game, a pitch in baseball, a pass in football, a basket in basketball, a golf shot in golf, and the like, may all be micro-events within the context of the present disclosure. Therefore, micro-events of the real world event are mapped to micro-events of the virtual event. For example, a goal in a hockey game may be mapped to a movement in a tug-of-war.

Other information about the real world event, such as position of various participants, and weather conditions, may also be mapped to the virtual event.

Embodiments of the present disclosure may be provided as a library of functions and classes or an API. The library or API may implement client functionality, up to providing and rendering three-dimensional animated avatars, or may simply receive the appropriate data from the server and leave the rendering of avatars to the main application. Similarly, the library or API may implement server side functionality, up to the video analysis of the real world event and the generation of data from the video analysis, or the reading of data from various sensors. Alternatively the library or API may implement server side functionality starting at the registration of clients and transmission of updates and leave the generation of data to the main application.

The library or API may be provided as part of a Software Development Kit (SDK) comprising a compiler as well as a plurality of other libraries or APIs useful in providing a complete client or server software. For example, three-dimensional graphics libraries and APIs may also be provided. The SDK may further provide graphical user interfaces for facilitating the mapping of various types of micro-events to virtual micro-events and generating code to implement the mapping. A default mapping of one avatar for one participant of the real world event may be provided to be modified as required by a programmer.

In further cases, a developer may customize a mapping of real world events, environments or other features to the particular aspects of the virtual world that the developer is creating. For example, the mapping may define the type of movement and animation of the particular avatar being developed. In other cases, events or environments may cause virtual events or environments to change.

Therefore, based on the embodiments described above, a real-world event could be mapped to a virtual platform to create a new type of event that a user could then participate in, including potentially make bets on. The real-world statistics, including statistics for the players/horses/participants, as well as environmental factors, could be mapped to the virtual environment, to allow for betting to occur. The results in the virtual environment reflect the results in the real world.

Consider an embodiment, for example, where the real-world event is a team sport mapped to a virtual, avatar-based super hero one-on-one fighting match. This example can be considered a many-to-one mapping where an entire real-world team is mapped to single super hero. In such cases, attributes of the team can be compiled related to the real-world, real-time action. Example team attributes could include an observed play (e.g., a football play), a field position, a center of action (e.g., the geometric center of the players, etc.), a centroid of play, an aggregate score, or other team related metrics. Such team related metrics or attributes can then be assigned to the corresponding super hero actions. For example, the center of action of a team could represent the super hero's position on a playing field, or the observed play could represent the type of attack performed by the super hero. Thus, the inventive subject matter includes converting a team's attributes into attributes of a digital representation of an avatar. One should appreciate that using a team's attributes does not preclude using individual player attributes as well.

In more preferred embodiments, the player or team attributes are used to give rise to virtual or avatar-based events suitable for side bets. For example, a side bet for a football game could be created via a suitable user interface for how many yards will be gained in the next five minutes. Note that there are multiple sources of attributes available for such a side bet, possibly including team attributes, player attributes, arena attributes, umpire or referee attributes, audience attributes, field attributes, or other factors. One or more of these types of attributes can be used in construction of the corresponding avatar-based side bet. The avatar-based side bet, in this example, would also last for five minutes and might include a metaphor such as a virtual eating game where the real-world team is modeled as a Viking at a table. The amount of food eaten would represent the number of yards and any penalties could represent additional food placed on the table.

Figure 10:
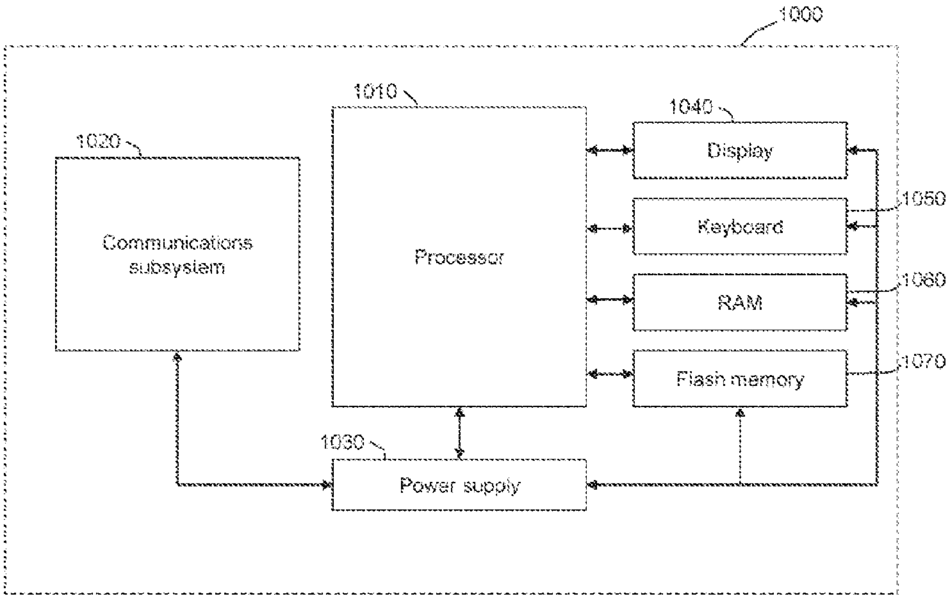
FIG. 10 is a schematic diagram of a client device according to at least one embodiment of the present disclosure.

The present disclosure may be implemented on a client device such as a desktop computer, a laptop computer, a smart phone, a tablet, and the like. One exemplary client device is illustrated with respect to FIG. 10.

Client device 1000 comprises a processor 1010, a communications subsystem 1020, and a suitable casing to protect the processor from any elements it may be exposed to. In at least some embodiments, client device 1000 further comprises a user interface such as buttons or keyboard 1050, a display screen or touch screen 1040, or other elements to provide a user interface. Client device 1000 may further comprise random access memory (RAM) 1060 and flash memory (or other types of non-volatile memory) 1070. Client device 1000 further comprises a power supply 1030.

Figure 11:
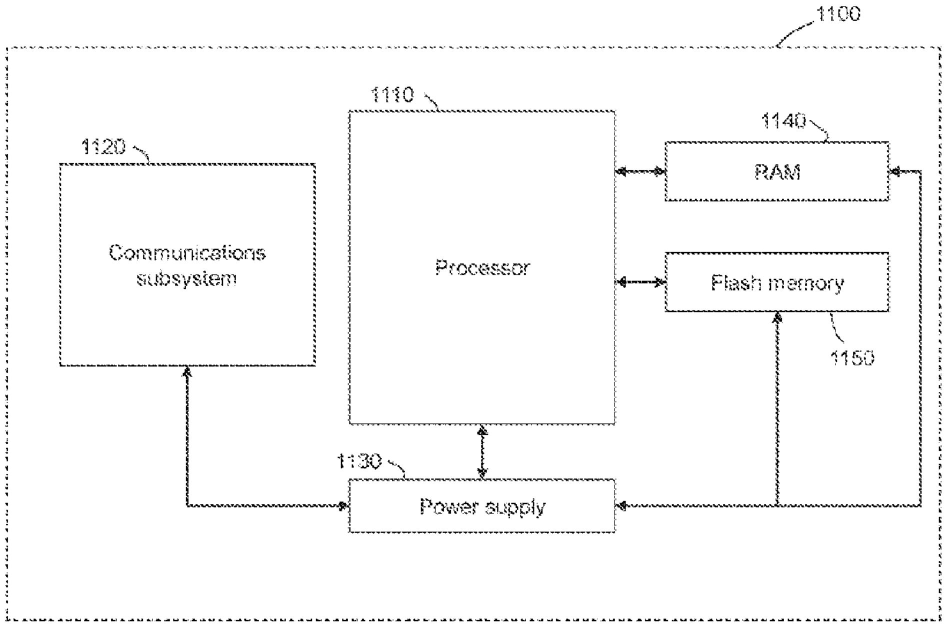
FIG. 11 is a schematic diagram of a server according to at least one embodiment of the present disclosure.

The present disclosure may also be implemented on a server, such as the server illustrated with respect to FIG. 11.

Server 1100 comprises a processor 1110, a communications subsystem 1120, a power supply 1130, RAM 1140, and flash memory of other types of non-volatile memory 1050.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

In addition, the embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

The invention claimed is:

1. A virtual event broadcasting system comprising:

at least one non-transitory computer readable memory storing software instructions; and at least one processor coupled with the at least one memory and, upon execution of the software instructions, performs the following operations:

generating an event identifier representing a real-world event having a plurality of real-world participants;

storing, in a client device memory, one avatar of a virtual environment presentation associated with the event identifier for at least one of the real-world participants;

generating a participant identifier for each of the at least one of the real-world participants;

mapping each participant identifier to a corresponding avatar;

transmitting, to the client device, an event update message related to a change in the real-world event and including at least some of the participant identifiers with movement information for the corresponding real-world participants in the real-world event; and causing the client device to update the virtual environment presentation related to the real-world event by updating a movement of the corresponding avatar for each of the at least some of the participant identifiers according to their respective movement information.

2. The system of claim 1, wherein the plurality of real-world participants includes at least one Artificial Intelligence (AI) participant.

3. The system of claim 1, wherein the virtual environment presentation comprises an altered time perspective relative to the real-world event.

4. The system of claim 3, wherein the altered time perspective comprises at least one of the following: a time expansion, a time shift, a time contraction, a rearranged time, and a dramatic effect.

5. The system of claim 1, where each participant identifier is mapped to their corresponding avatar via at least one of the following: a pointer, a look up table, a hash table, and a database.

6. The system of claim 1, wherein the movement of the corresponding avatar in the virtual environment is proportional to a position of the corresponding real-world participant in the real-world event.

7. The system of claim 1, wherein the movement of the corresponding avatar in the virtual environment is proportional to a distance traveled in the real-world event by the corresponding real-world participant.

8. The system of claim 1, wherein the event update message further includes an environmental condition for the real-world event.

9. The system of claim 8, wherein the virtual environment presentation is updated based on the environmental condition.

10. The system of claim 9, wherein the environmental condition comprises a weather condition.

11. The system of claim 1, wherein the event message update comprises at least one packet sent over a network.

12. The system of claim 11, wherein the at least one packet comprises at least one of the following types of data: binary encoded data, JSON encoded data, XML encoded data, and encrypted data.

13. The system of claim 1, wherein the operations further include synchronizing the virtual environment presentation among multiple client devices including the at least one client device.

14. The system of claim 13, wherein the operations further include delaying transmission of the event update message to the at least one client device.

15. The system of claim 13, wherein the operations further include minimizing latency between the real-world event and the virtual environment presentation.

16. The system of claim 1, wherein the event update message comprises a real-time message.

17. The system of claim 1, wherein the operations further include transmitting a session identifier representing a session to the at least one client device.

18. The system of claim 17, wherein the event identifier represents an event within the session.

19. The system of claim 17, wherein the event identifier is unique within the session.

20. The system of claim 1, wherein the event identifier comprises a globally unique identifier.

21. The system of claim 1, wherein the operations further include restricting access to the real-world event based on a location of the at least one client device.

22. A non-transitory computer-readable medium having stored thereon executable code for execution by a processor of a computing device, the executable code comprising instructions for:

generating an event identifier representing a real-world event having a plurality of real-world participants;

storing, in a client device memory, one avatar of a virtual environment presentation associated with the event identifier for at least one of the real-world participants;

generating a participant identifier for each of the at least one of the real-world participants;

mapping each participant identifier to a corresponding avatar;

transmitting, to the client device, an event update message related to a change in the real-world event and including at least some of the participant identifiers with movement information for the corresponding real-world participants in the real-world event; and causing the client device to update the virtual environment presentation related to the real-world event by updating a movement of the corresponding avatar for each of the at least some of the participant identifiers according to their respective movement information.

23. A method for broadcasting a virtual event, comprising:

generating an event identifier representing a real-world event having a plurality of real-world participants;

storing, in a client device memory, one avatar of a virtual environment presentation associated with the event identifier for at least one of the real-world participants;

generating a participant identifier for each of the at least one of the real-world participants;

mapping each participant identifier to a corresponding avatar;

transmitting, to the client device, an event update message related to a change in the real-world event and including at least some of the participant identifiers with movement information for the corresponding real-world participants in the real-world event; and causing the client device to update the virtual environment presentation related to the real-world event by updating a movement of the corresponding avatar for each of the at least some of the participant identifiers according to their respective movement information.

24. A virtual event broadcasting system comprising:

at least one non-transitory computer readable memory storing software instructions; and at least one processor coupled with the at least one memory and, upon execution of the software instructions, performs the following operations:

receiving a message from a server, the message comprising an event identifier representing a real-world event having a plurality of real-world participants, and information on the plurality of real-world participants;

storing, in the memory, one avatar of a virtual environment presentation associated with the event identifier for at least one of the real-world participants;

receiving a participant identifier for each of the plurality of real-world participants;

mapping each participant identifier to a corresponding avatar;

receiving, from the server, an event update message related to a change in the real-world event and including at least some of the participant identifiers with movement information for the corresponding real-world participants in the real-world event; and updating the virtual environment presentation related to the real-world event by updating a movement of the corresponding avatar for each of the at least some of the participant identifiers according to their respective movement information.

25. A virtual event broadcasting system comprising:

at least one non-transitory computer readable memory storing software instructions; and at least one processor coupled with the at least one memory and, upon execution of the software instructions, performs the following operations:

generating an event identifier representing a real-world event having a plurality of real-world participants;

generating a participant identifier for each of the at least one of the real-world participants; and transmitting, to a client device, an event update message related to a change in the real-world event and including at least some of the participant identifiers with movement information for the corresponding real-world participants in the real-world event;

wherein the event updated message causes the client device to update a virtual environment presentation related to the real-world event by updating a movement of a plurality of avatars corresponding to each of the at least some of the participant identifiers according to their respective movement information.

26. A virtual event broadcasting system comprising:

a server device; and a client device;

wherein the server device is configured to:

generate an event identifier representing a real-world event having a plurality of real-world participants;

generate a participant identifier for each of the real-world participants; and transmit, to the client device, an event update message related to a change in the real-world event and including at least some of the participant identifiers with movement information for the corresponding real-world participants in the real-world event; and wherein the client device is configured to:

store, in the client device memory, an avatar of a virtual environment presentation associated with the event identifier for at least one of the real-world participants;

map each participant identifier to a corresponding avatar;

upon receiving the event update message, update the virtual environment presentation related to the real-world event by updating a movement of the corresponding avatar for each of the at least some of the participant identifiers according to their respective movement information.

* * * * *